INVENTORS
CORNELIS & ARY VAN DER LELY

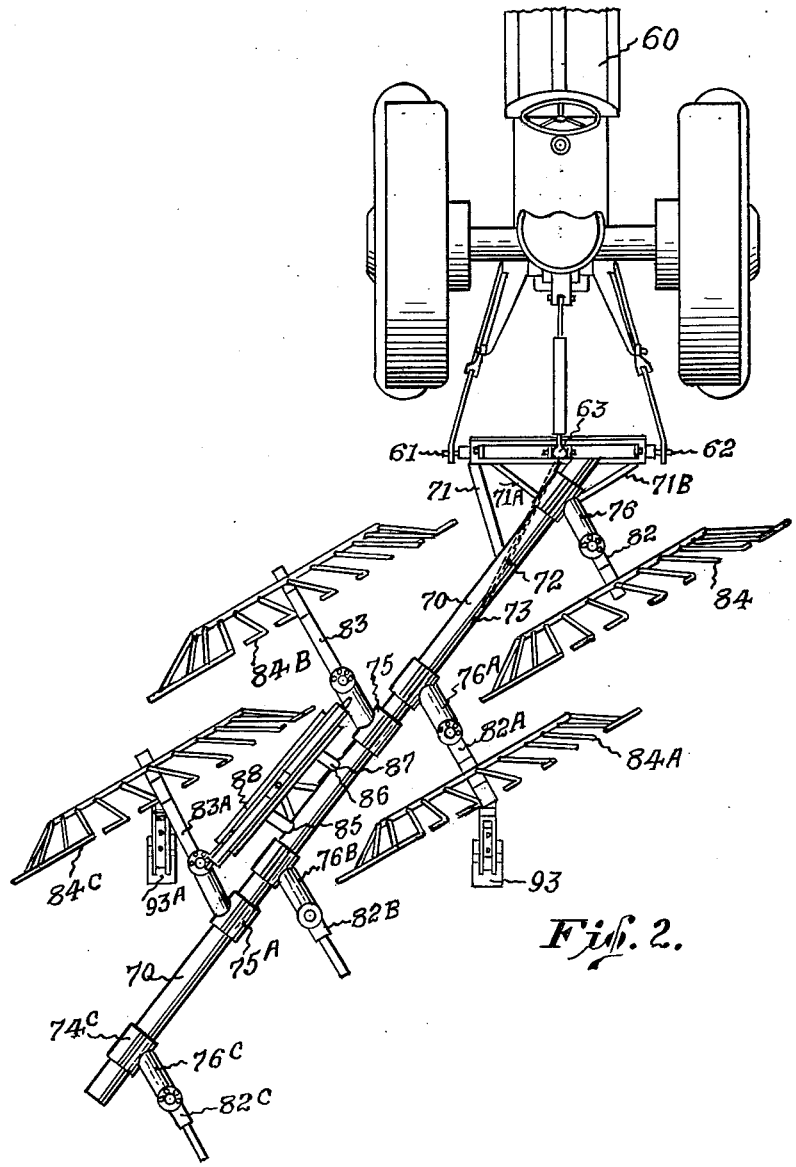

Oct. 29, 1963 C. VAN DER LELY ETAL 3,108,423
CONVERTIBLE SIDE DELIVERY RAKE
Original Filed Nov. 28, 1955 3 Sheets-Sheet 3
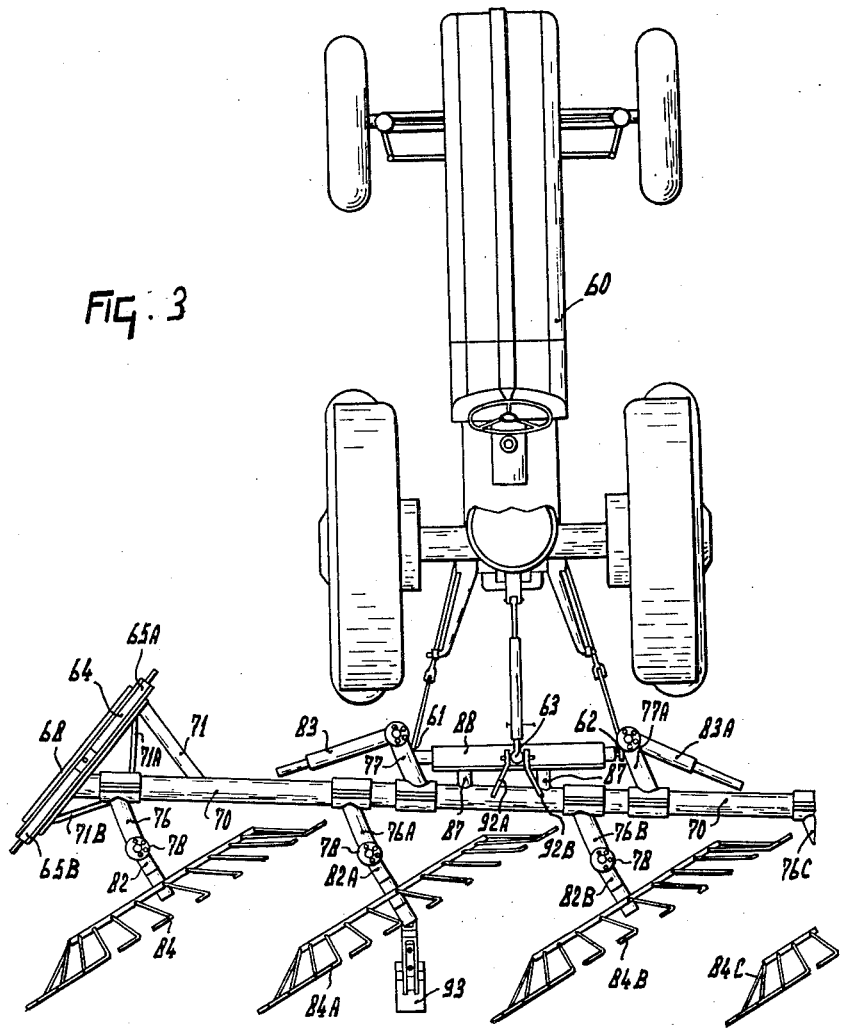
INVENTORS
CORNELIS & ARY VAN DER LELY
BY
Mason, Mason & Albright United States Patent Office 3,108,423
Patented Oct. 29, 1963

3,108,423
CONVERTIBLE SIDE DELIVERY RAKE
Cornelis van der Lely, Zug, Switzerland, and Ary van der Lely, Maasland, Netherlands, assignors to C. van der Lely N.V., Maasland, Netherlands, a Dutch limited-liability company
Original application Nov. 28, 1955, Ser. No. 549,482, now Patent No. 2,933,878, dated Apr. 26, 1960. Divided and this application Apr. 14, 1960, Ser. No. 22,241
10 Claims. (Cl. 56—377)

The invention relates to a side delivery rake of the kind having a plurality of overlapping rake wheels in echelon which are rotated by contact with the ground or the crop lying thereupon or both.

It is an object of the invention to provide such an implement which can conveniently be adjusted for a variety of rake wheel positions.

In accordance with the invention, there is a rake comprising draft means, a beam connected to said draft means, a plurality of spaced bushings operatively associated with said beam, a plurality of parallel axles extending substantially horizontally from said bushings, parallel rake wheels mounted on said axles, said bushings being selectively slideable along said beam whereby the spaced relation of said rake wheels along said beam may be changed.

According to another embodiment of the invention, a rake comprises draft means, a beam connected to said draft means, a plurality of parallel axles extending substantially horizontally from said bushings, parallel rake wheels mounted on said axles, said bushings being selectively rotatable about a horizontal axis, whereby said rake wheels may be rotated in a vertical plane to operative positions on either side of said beam. This construction permits the possibility of changing a side delivery rake into a swath turner.

According to a third embodiment of the invention, a rake comprises draft means, a frame, arms extending from said frame, vertical hinges on each of said arms, locking means incorporated in each of said hinges, whereby the said hinges may be selectively secured in different positions, a plurality of horizontal axles extending outwardly from said hinges, raking wheels mounted in echelon on said axles, whereby said rake can be converted to a tedder by the selective positioning of said hinges.

According to a fourth embodiment of the invention, a side delivery rake comprises draft means, a frame, said frame comprising a main frame beam, supporting arms extending laterally from said frame beam, rake wheels, rake wheel axles mounted on said arms, said supporting arms being mounted on different sides of said frame beam, the number of supporting arms on one side of the frame beam exceeding the number of supporting arms on the other side of that frame beam, the device constituting a side delivery rake when all the rake wheels are mounted on the supporting arms situated on one side of the frame beam, and constituting a tedder when part of the rake wheels are mounted on the supports on the other side of said frame beam.

This is a division of our application Serial No. 549,482, filed Nov. 28, 1955, which issued as Patent No. 2,933,-878, on April 26, 1960.

In order that the invention may be clearly understood and readily carried into effect, reference will now be made, by way of example, to the accompanying drawings, in which:

FIGURE 2 shows a plan view of the device in working position to serve as a swath turner; and FIGURE 3 shows a plan view of the device in working position to serve as a tedder.

Figure 1:
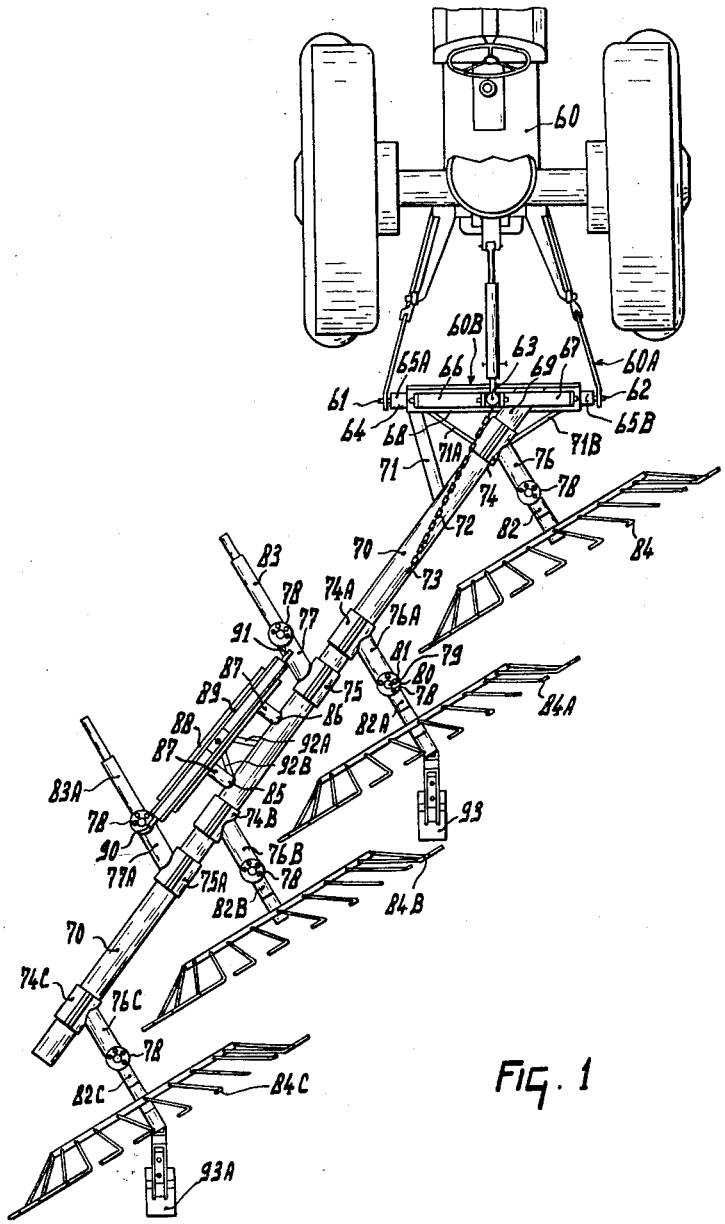
FIGURE 1 shows a plan view of a device attached to a tractor, the device being in position to operate as a side delivery rake.

Referring to FIGURE 1, a three-point lifting device 60A of a draft means such as tractor 60 has three link ends 61, 62 and 63, which carry a fastening device 60B for the frame of the implement. The fastening device consists of an axle 64 having ends 65A and 65B supporting bars 66 and 67 extending obliquely upwards and being hinged at the apex of their upper ends to the link end 63 and at their lower ends to bar 68.

The bar 68 is connected to an end 69 of a tubular beam 70 forming part of a frame, the connection being reinforced by bars 71, 71A, and 71B. It will be noted that bar 68 is also connected to axle 64 and that beam 70 is able to rotate about axle 64 with regard to the fastening device 60B. A chain 72 connects the link end 63 of the lifting device to a hook 73 on the beam 70. Six two-part sleeves or hinges 74, 74A, 74B, 74C, 75 and 75A are clamped on the beam 70, the four sleeves 74, 74A, 74B and 74C being spaced an equal distance apart. The distances between the sleeves or hinges 74, 74A, 74B, 74C and 75 and 75A can be changed as desired by simply releasing and reclamping the sleeves in different positions along the beam 70.

The sleeves or hinges 74, 74A, 74B, 74C, 75 and 75A carry short arms 76, 76A, 76B, 76C, 77 and 77A, respectively, the arms 76, 76A, 76B, and 76C being directed away from the tractor and the arms 77 and 77A being directed more towards the tractor. The arms 76, 76A, 76B, 76C, 77 and 77A are parallel and each carry a hinged connection 78 having a pivot 79. Each connection 78 can be secured in any one of a plurality of positions by the introduction of a pin 80 into any one of a number of holes 81 in order to fix the parts being interconnected against rotation. The connections 78 mounted on each of the arms 76, 76A, 76B, 76C, 77 and 77B connect the arms to horizontal axles 82, 82A, 82B, 82C, 83 and 83A, respectively. Rake wheels 84, 84A, 84B, and 84C are rotatably mounted on the axles 82, 82A, 82B, and 82C, respectively.

In the working position shown in FIGURE 1, the device constitutes a side delivery rake, the axles 82, 82A, 82B, and 82C serving as the supporting members for the rake wheels.

In the working position shown in FIGURE 2, the device constitutes a swath turner, the supporting members for the rake wheels consisting of the axles 82, 82A, 83 and 83A. It is inherent from the disclosed structure that this position can be obtained alternatively by moving further apart from each other the two inner sleeves 74A and 74B, or possibly displacing the two rearmost sleeves 74B and 74C away from the tractor and displacing the two foremost sleeves 74 and 74A towards the tractor.

Two short tubes 87 extend obliquely upwards, carry a bar 88, and are attached to the beam 70 at the points 85 and 86. A beam 89, carrying pins 90 and 91, one at each end, is mounted on the bar 88, and two short arms 92A and 92B are mounted on the beam 70 near the points 85 and 86. When it is desired to change the implement from the position shown in FIGURE 1 to the position shown in FIGURE 3, where it acts as a tedder, the fastening device is freed from the tractor 60, the frame is inverted, the pins 90 and 91 are hingedly connected to the link ends 62 and 61, respectively, and the arms 92A and 92B are hingedly connected to the link end 63.

By adjusting the connections 78, the position of the raking members can be arranged relative to one another in each of the three working positions described in connection with FIGURES 1, 2 and 3. The swath turner shown in FIGURE 2 can be adjusted to suit the distance between the swaths by sliding the sleeves 75 and 75A along the beam 70.

In the working position shown in FIGURES 1 and 3, alternate axles 82A and 82C passing through the rake wheels 84 are provided at their extremities with supporting devices including shoes 93 and 93A, secured so that shoes 93 and 93A ride on the ground.

In the working position shown in FIGURE 3, the rake wheels 84, 84A, 84B and 84C occupy almost the same position with regard to the frame as in the working position shown in FIGURE 1, the supporting devices including the shoes 93 and 93A being rotated, however, through 180° about their respective axles 82 relative to the frame, so that the shoe 93 and 93A can again be secured to rest upon the ground.

In the working position shown in FIGURE 2, a supporting device is mounted on the axle 83A in addition to a rake wheel 84C.

The above description and drawings disclose several embodiments of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

We claim:

1. A side delivery rake comprising draft means, a beam connected to said draft means and extending obliquely in the intended direction of movement of the device, a plurality of spaced sleeves operatively associated with said beam, a plurality of arms rigidly connected to said sleeves, a plurality of parallel axles pivotally connected to said arms, parallel rake wheels mounted on said axles, said sleeves being selectively slideable along said beam whereby the spaced relation of said rake wheels along said beam may be changed.

2. A rake as set forth in claim 1, wherein all said axles are arranged for mounting rake wheels at one side of the frame beam, the device then constituting a side delivery rake.

3. A rake as set forth in claim 1, wherein said axles permit mounting rake wheels at both sides of the frame, whereby the device would constitute a swath turner.

4. A rake as set forth in claim 1, wherein the arrangement is such that said frame beam may be inverted to obtain a working position in which the device constitutes a tedder.

5. A side delivery rake as set forth in claim 1, wherein said sleeves constitute gripping means.

6. A side delivery rake comprising draft means, a frame, arms extending from said frame, vertical hinges on each of said arms, securing means incorporated in each of said hinges whereby the said hinges may be selectively secured in different positions, a plurality of horizontal axles extending outwardly from said hinges, raking wheels mounted on said axles, whereby said rake can be converted to a tedder by selectively positioning said hinges.

7. A side delivery rake as set forth in claim 6, wherein said frame consists substantially of one main frame beam.

8. A side delivery rake as set forth in claim 7, wherein said vertical hinges are spaced away from said beam.

9. A side delivery rake as set forth in claim 6, wherein the rake wheel planes are spaced further apart in the teddering position than in the side delivery position.

10. A rake comprising draft means, a frame, said frame comprising a main frame beam, supporting arms extending laterally from said frame beam, rake wheels, rake wheel axles mounted on said arms, said supporting arms being mounted on different sides of said frame beam, the number of supporting arms on one side of the frame beam exceeding the number of supporting arms on the other side of that frame beam, the device constituting a side delivery rake when all the rake wheels are mounted on the supporting arms situated at one side of the frame beam and constituting a tedder when part of the rake wheels are mounted on the supports on the other side of said frame beam.

References Cited in the file of this patent

UNITED STATES PATENTS

| | | |
|---|---|---|
| 2,532,652 | Wray | Dec. 5, 1950 |
| 2,670,588 | Plant | Mar. 2, 1954 |
| 2,876,613 | Van der Lely et al. | Mar. 10, 1959 |

FOREIGN PATENTS

| | | |
|---|---|---|
| 1,081,746 | France | June 9, 1954 |
| 532,560 | Belgium | Oct. 30, 1954 |
| 532,929 | Belgium | Nov. 13, 1954 |